(12) United States Patent
Kawashiri et al.

(10) Patent No.: US 10,408,341 B2
(45) Date of Patent: Sep. 10, 2019

(54) CONTROL DEVICE FOR TRANSMISSION

(71) Applicant: SUBARU CORPORATION, Tokyo (JP)

(72) Inventors: Takahiro Kawashiri, Tokyo (JP); Kohsuke Kikuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 63 days.

(21) Appl. No.: 15/864,658

(22) Filed: Jan. 8, 2018

(65) Prior Publication Data

US 2018/0283537 A1    Oct. 4, 2018

(30) Foreign Application Priority Data

Mar. 29, 2017  (JP) ................................ 2017-066185

(51) Int. Cl.
*F16H 61/16* (2006.01)
*F16H 61/02* (2006.01)
(Continued)

(52) U.S. Cl.
CPC ........ *F16H 61/0213* (2013.01); *F16H 61/16* (2013.01); *F16H 59/20* (2013.01); *F16H 59/44* (2013.01); *F16H 59/66* (2013.01); *F16H 2059/663* (2013.01); *F16H 2061/0227* (2013.01); *F16H 2306/14* (2013.01)

(58) Field of Classification Search
None
See application file for complete search history.

(56) References Cited

U.S. PATENT DOCUMENTS 6,487,485 B1 * 11/2002 Henneken .......... F16H 61/0213
                                                  701/56
7,678,005 B2 * 3/2010 Tuckfield ............... B60K 6/365
                                                  475/131
(Continued)

FOREIGN PATENT DOCUMENTS

JP      H 03-209052 A    9/1991
JP      2008-051152 A    3/2008
(Continued)

OTHER PUBLICATIONS

Japanese Office Action, dated Sep. 4, 2018, in Japanese Application No. 2017-066185 and English Translation thereof.
(Continued)

*Primary Examiner* — Dirk Wright
(74) *Attorney, Agent, or Firm* — McGinn IP Law Group, PLLC.

(57) ABSTRACT

A control device for a transmission that has multiple shift stages and is configured to change an amount of power output from an engine of a vehicle for output includes a setting unit and a control unit. The setting unit is capable of setting, as a shift change mode, either one of a first shift change mode and a second shift change mode in which a speed of the engine is maintained in a higher state than that in the first shift change mode. The control unit is configured to execute shift change control on a basis of the set shift change mode. The control unit is configured to exclude one or more shift stages of the multiple shift stages and execute the shift change control when the second shift change mode is set.

16 Claims, 13 Drawing Sheets

(51) Int. Cl.
    *F16H 59/20*     (2006.01)
    *F16H 59/44*     (2006.01)
    *F16H 59/66*     (2006.01)

(56) References Cited

U.S. PATENT DOCUMENTS

| | | | |
|---|---|---|---|
| 7,680,575 B2 * | 3/2010 | Han | F16H 61/0213 |
| | | | 701/51 |
| 8,751,121 B2 * | 6/2014 | Takeuchi | F16H 61/0213 |
| | | | 180/65.265 |
| 2012/0310497 A1 | 12/2012 | Haneda | |
| 2013/0110360 A1 | 5/2013 | Saito et al. | |
| 2016/0201797 A1 | 7/2016 | Lowndes et al. | |

FOREIGN PATENT DOCUMENTS

| | | |
|---|---|---|
| JP | 2012-219904 A | 11/2012 |
| JP | 5786648 B2 | 9/2015 |
| JP | 2016-155445 A | 9/2016 |
| JP | 2016-531255 A | 10/2016 |
| WO | WO 2011/118479 A1 | 9/2011 |

OTHER PUBLICATIONS

JPO Decision of Grant dated Mar. 12, 2019 with English Translation thereof.

\* cited by examiner

FIG. 4

|  | B1 | B2 | C1 | C2 | C3 | C4 |
|---|---|---|---|---|---|---|
| 1st |  | ○ |  | ○ | ○ | ○ |
| 2nd | ○ | ○ |  | ○ | ○ |  |
| 3rd | ○ |  |  | ○ | ○ | ○ |
| 4th | ○ |  | ○ | ○ | ○ |  |
| 5th | ○ |  | ○ |  | ○ | ○ |
| 6th |  |  | ○ | ○ | ○ | ○ |
| 7th | ○ |  | ○ | ○ |  | ○ |
| 8th |  | ○ | ○ | ○ |  | ○ |
| 9th | ○ | ○ | ○ |  |  | ○ |
| Rev |  | ○ | ○ | ○ | ○ |  |

FIG. 5

|  | GEAR RATIO |
|---|---|
| 1st | 4.71 |
| 2nd | 3.45 |
| 3rd | 2.52 |
| 4th | 1.68 |
| 5th | 1.13 |
| 6th | 1.00 |
| 7th | 0.89 |
| 8th | 0.72 |
| 9th | 0.55 |
| Rev | −4.60 |

FIG. 6

|  | STEP RATIO |
|---|---|
| 1st—2nd | 1.37 |
| 2nd—3rd | 1.37 |
| 3rd—4th | 1.50 |
| 4th—5th | 1.49 |
| 5th—6th | 1.13 |
| 6th—7th | 1.12 |
| 7th—8th | 1.24 |
| 8th—9th | 1.31 |

| | STEP RATIO |
|---|---|
| 1st—3rd | 1.87 |
| 3rd—4th | 1.50 |
| 4th—5th | 1.49 |
| 5th—7th | 1.27 |
| 7th—8th | 1.24 |
| 8th—9th | 1.31 |

CONTROL DEVICE FOR TRANSMISSION

CROSS-REFERENCE TO RELATED APPLICATIONS

The present application claims priority from Japanese Patent Application No. 2017-066185 filed on Mar. 29, 2017, the entire contents of which are hereby incorporated by reference.

BACKGROUND

1. Technical Field

The present invention relates to a control device for a transmission.

2. Related Art

A transmission that has multiple shift stages and changes an amount of power output from an engine of a vehicle for output has conventionally been known. A control device for such a transmission has been available. The control device can set any of plural modes as a shift change mode, and executes shift change control on the basis of the set shift change mode. In the shift change control, a gear ratio of the transmission is automatically controlled (for instance, see Japanese Patent No. 5786648).

In the shift change control of the transmission having the multiple shift stages, such a shift change mode is possibly set that an engine speed is maintained in a high state. In this case, compared to a case where any of the other shift change modes is set, the engine speed is maintained in the high state. Thus, acceleration performance can be improved, and this leads to expectation of improved drivability. However, in the shift change control of the transmission having the multiple shift stages, shift-change timing is influenced by a setting value of the gear ratio at the each shift stage. As a result, due to the setting value of the gear ratio at the each shift stage, the shift stage may be changed at different timing from a driver's intended timing, and the driver may receive a sense of discomfort.

SUMMARY OF THE INVENTION

It is desirable to provide a novel and improved control device for a transmission, the control device capable of improving drivability of a vehicle on which a transmission having multiple shift stages is mounted.

An aspect of the present invention provides a control device for a transmission that has multiple shift stages and is configured to change an amount of power output from an engine of a vehicle for output. The control unit for the transmission includes a setting unit and a control unit. The setting unit is capable of setting, as a shift change mode, either one of a first shift change mode and a second shift change mode in which a speed of the engine is maintained in a higher state than that in the first shift change mode. The control unit is configured to execute shift change control on the basis of the set shift change mode. The control unit is configured to exclude one or more shift stages of the multiple shift stages and execute the shift change control when the second shift change mode is set.

BRIEF DESCRIPTION OF THE DRAWINGS

FIG. 4 is a table illustrating an engaged state of each coupling mechanism at each shift stage in the transmission according to the example.

FIG. 5 is a table illustrating an instance of a gear ratio at the each shift stage in the transmission according to the example.

FIG. 6 is a table illustrating an instance of step ratios between the adjacent shift stages in the transmission according to the example.

DETAILED DESCRIPTION

A preferred example of the present invention will hereinafter be described in detail with reference to the accompanying drawings. In the specification and the drawings, components that have substantially the same functional configurations will be denoted by the same reference signs and will not be described repeatedly.

<1. Configuration of Drive System in Vehicle>

A description will be made on a configuration of a drive system in a vehicle 10 that includes a control device 100 according to the example of the present invention with reference to FIG. 1 to FIG. 7.

Figure 1:
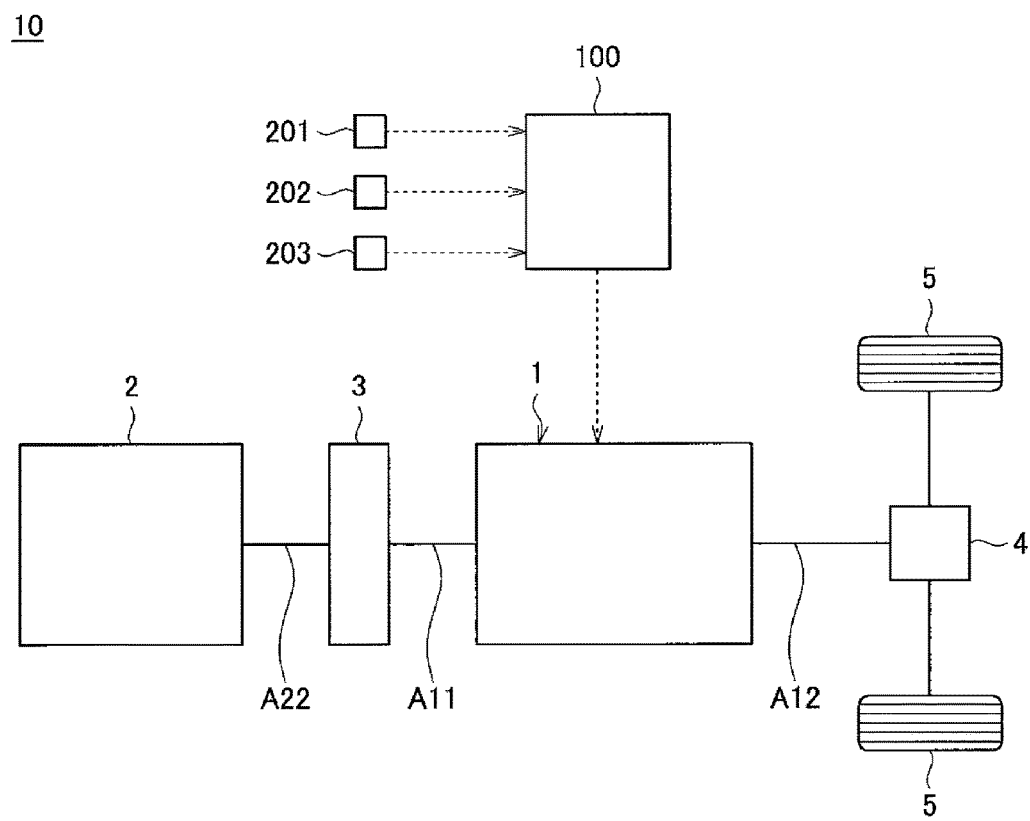
FIG. 1 is a schematic view illustrating an instance of a schematic configuration of a drive system in a vehicle that includes a control device according to an example of the present invention.
Figure 2:
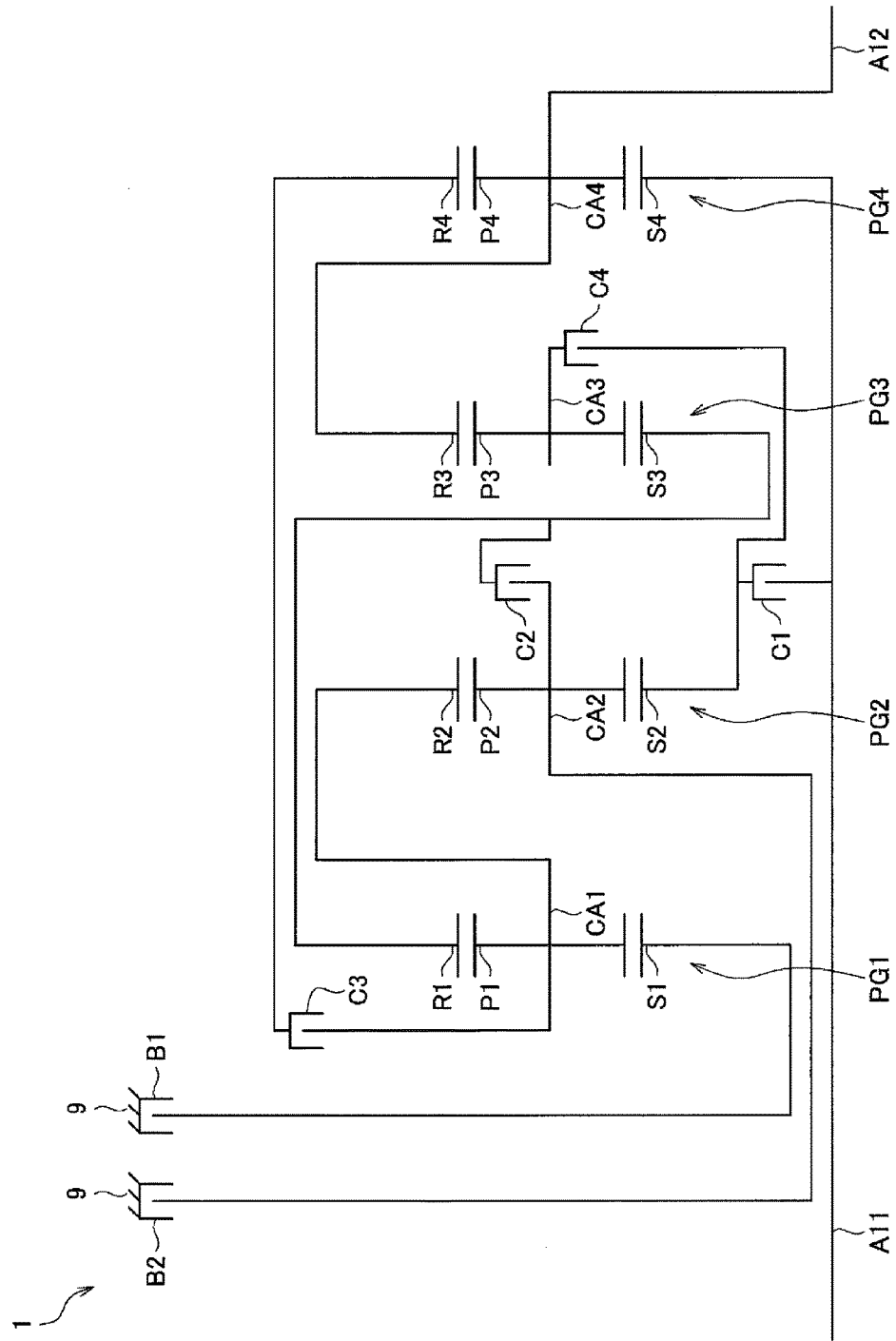
FIG. 2 is a skeleton diagram illustrating an instance of a schematic configuration of a transmission according to the example.
Figure 3:
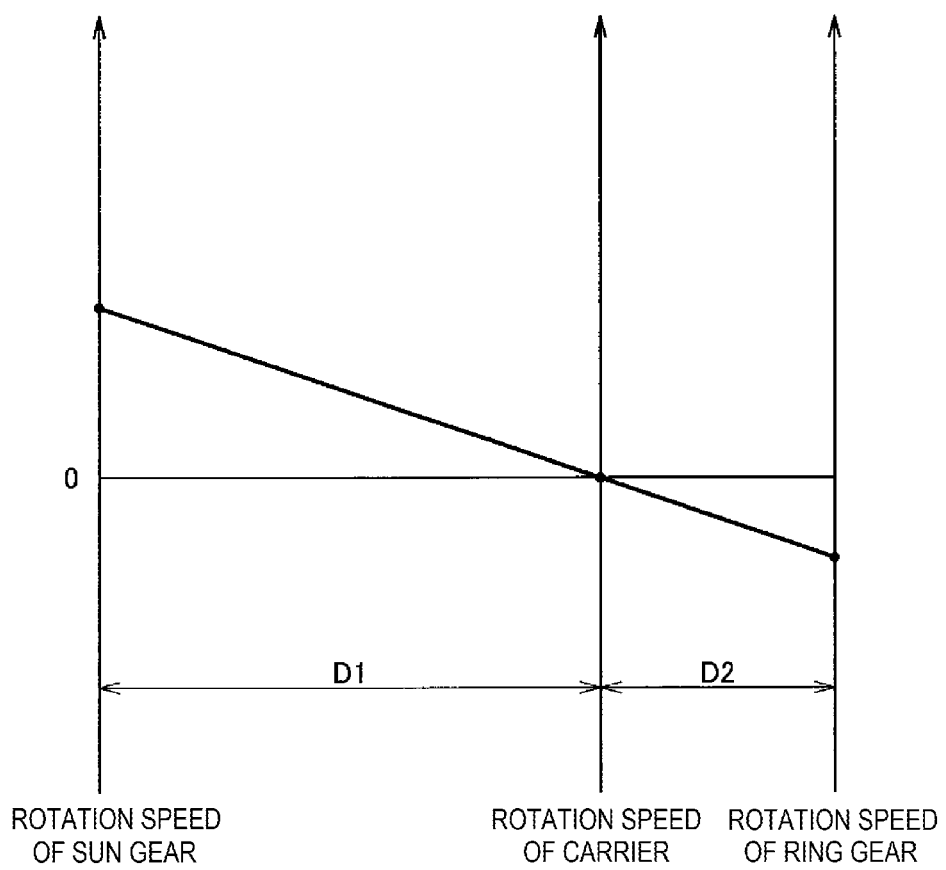
FIG. 3 is a collinear diagram illustrating a relationship among rotation speeds of a sun gear, a carrier, and a ring gear in a planetary gear mechanism.

FIG. 1 is a schematic view illustrating an instance of the schematic configuration of the drive system in the vehicle 10 that includes the control device 100 according to the example. FIG. 2 is a skeleton diagram illustrating an instance of a schematic configuration of a transmission 1 according to the example. FIG. 3 is a collinear diagram illustrating a relationship among rotation speeds of a sun gear, a carrier, and a ring gear in a planetary gear mechanism.

For instance, as illustrated in FIG. 1, the drive system of the vehicle 10 includes an engine 2, a torque converter 3, the transmission 1, a differential device 4, a right and left pair of drive wheels 5, a vehicle speed sensor 201, an accelerator opening degree sensor 202, an acceleration sensor 203, and the control device 100.

For instance, the engine 2 is an internal combustion engine that uses gasoline or the like as fuel to generate power. An output shaft A22 of the engine 2 is coupled to an input shaft A11 of the transmission 1 via the torque converter 3. Accordingly, the power output from the engine 2 is received by the input shaft A11 of the transmission 1 via the torque converter 3, and the transmission 1 changes an amount of the power. The power is then output from an output shaft A12 of the transmission 1. Just as described, the transmission 1 changes the amount of the power, which is output from the engine 2 of the vehicle 10, for output. The output shaft A12 of the transmission 1 is coupled to the differential device 4, and the differential device 4 is coupled to the right and left pair of drive wheels 5 via drive shafts. Accordingly, the power output from the output shaft A12 of the transmission 1 is transmitted to the differential device 4, is split and transmitted to the right and left pair of drive wheels 5 by the differential device 4.

The right and left pair of drive wheels 5 may be front wheels or rear wheels. The power output from the engine 2 may be transmitted to both of the front wheels and the rear wheels. In this case, the output shaft A12 of the transmission 1 is coupled to a front differential device and a rear differential device. The front differential device splits the power and transmits the split power to the right and left pair of front wheels. The rear differential device splits the power and transmits the split power to the right and left pair of rear wheels.

For instance, as illustrated in FIG. 2, the transmission 1 includes the input shaft A11, the output shaft A12, a first planetary gear mechanism PG1, a second planetary gear mechanism PG2, a third planetary gear mechanism PG3, a fourth planetary gear mechanism PG4, a first brake B1, a second brake B2, a first clutch C1, a second clutch C2, a third clutch C3, and a fourth clutch C4. The transmission 1 has multiple shift stages and changes the amount of the power, which is output from the engine 2, in accordance with a transmission gear ratio that corresponds to the each shift stage. Then, transmission 1 outputs the power to the drive wheel 5 side.

Each of the first planetary gear mechanism PG1, the second planetary gear mechanism PG2, the third planetary gear mechanism PG3, and the fourth planetary gear mechanism PG4 is provided in a case 9, and is the planetary gear mechanism that includes the sun gear, the carrier, and the ring gear as rotation elements. Just as described, the transmission 1 includes the four planetary gear mechanisms. In the case 9, the four planetary gear mechanisms are coaxially disposed in an order of the first planetary gear mechanism PG1, the second planetary gear mechanism PG2, the third planetary gear mechanism PG3, and the fourth planetary gear mechanism PG4.

More specifically, each of the planetary gear mechanisms is of a single pinion type. As illustrated in FIG. 3, the rotation speeds of the sun gear, the carrier, and the ring gear in the each planetary gear mechanism have a relationship of being aligned on a straight line in the collinear diagram. An interval D1 is set between vertical axes that represent the rotation speeds of the sun gear and the carrier. An interval D2 is set between vertical axes that represents the rotation speeds of the carrier and the ring gear. A ratio between the interval D1 and the interval D2 is equal to a ratio between the number of teeth of the ring gear and the number of teeth of the sun gear. When the carrier is fixed, a ratio of the rotation speed of the ring gear to the rotation speed of the sun gear is set as a gear ratio of the planetary gear mechanism. In such a case, the gear ratio of the planetary gear mechanism has a value that is acquired by dividing the number of teeth of the sun gear by the number of teeth of the ring gear. In the each planetary gear mechanism, the number of teeth of the ring gear and the number of teeth of the sun gear are appropriately set. In this way, the gear ratio of the each planetary gear mechanism can be set to a desired gear ratio.

The first planetary gear mechanism PG1 includes: a sun gear S1; a ring gear R1 that is coaxially disposed on an outer circumferential side of the sun gear S1; plural pinion gears P1, each of which meshes with the sun gear S1 and the ring gear R1; and a carrier CA1 that supports the plural pinion gears P1 in a manner to allow rotation and revolution thereof. The gear ratio of the first planetary gear mechanism PG1 is set to 0.56, for instance.

The second planetary gear mechanism PG2 includes: a sun gear S2; a ring gear R2 that is coaxially disposed on an outer circumferential side of the sun gear S2; plural pinion gears P2, each of which meshes with the sun gear S2 and the ring gear R2; and a carrier CA2 that supports the plural pinion gears P2 in a manner to allow rotation and revolution thereof. The gear ratio of the second planetary gear mechanism PG2 is set to 0.71, for instance.

The third planetary gear mechanism PG3 includes: a sun gear S3; a ring gear R3 that is coaxially disposed on an outer circumferential side of the sun gear S3; plural pinion gears P3, each of which meshes with the sun gear S3 and the ring gear R3; and a carrier CA3 that supports the plural pinion gears P3 in a manner to allow rotation and revolution thereof. The gear ratio of the third planetary gear mechanism PG3 is set to 0.38, for instance.

The fourth planetary gear mechanism PG4 includes: a sun gear S4; a ring gear R4 that is coaxially disposed on an outer circumferential side of the sun gear S4; plural pinion gears P4, each of which meshes with the sun gear S4 and the ring gear R4; and a carrier CA4 that supports the plural pinion gears P4 in a manner to allow rotation and revolution thereof. The gear ratio of the fourth planetary gear mechanism PG4 is set to 0.41, for instance.

In the transmission 1, some of the rotation elements of the planetary gear mechanisms are coupled to other elements. The other elements may include the input shaft A11, the output shaft A12, and the case 9 in addition to the rotation elements of the planetary gear mechanisms.

The carrier CA1 of the first planetary gear mechanism PG1 is coupled to the ring gear R2 of the second planetary gear mechanism PG2. Thus, the rotation speed of the carrier CA1 of the first planetary gear mechanism PG1 is equal to the rotation speed of the ring gear R2 of the second planetary gear mechanism PG2.

The ring gear R1 of the first planetary gear mechanism PG1 is coupled to the sun gear S3 of the third planetary gear mechanism PG3. Thus, the rotation speed of the ring gear R1 of the first planetary gear mechanism PG1 is equal to the rotation speed of the sun gear S3 of the third planetary gear mechanism PG3.

The ring gear R3 of the third planetary gear mechanism PG3 is coupled to the carrier CA4 of the fourth planetary gear mechanism PG4. Thus, the rotation speed of the ring gear R3 of the third planetary gear mechanism PG3 is equal to the rotation speed of the carrier CA4 of the fourth planetary gear mechanism PG4.

The sun gear S4 of the fourth planetary gear mechanism PG4 is coupled to the input shaft A11. Thus, the rotation speed of the sun gear S4 of the fourth planetary gear mechanism PG4 is equal to a rotation speed of the input shaft A11.

The carrier CA4 of the fourth planetary gear mechanism PG4 is coupled to the output shaft A12. Thus, the rotation speed of the carrier CA4 of the fourth planetary gear mechanism PG4 is equal to a rotation speed of the output shaft A12.

Each of the first brake B1, the second brake B2, the first clutch C1, the second clutch C2, the third clutch C3, and the fourth clutch C4 is a coupling mechanism capable of switching a coupling state between the rotation element of the planetary gear mechanism and another element. Just as described, the transmission 1 includes the six coupling mechanisms. In the example, the first brake B1, the second brake B2, the first clutch C1, the second clutch C2, the third clutch C3, and the fourth clutch C4 may respectively serve as a "first coupling mechanism", a "second coupling mechanism", a "third coupling mechanism", a "fourth coupling mechanism", a "fifth coupling mechanism", and a "sixth coupling mechanism".

The each brake can switch the coupling state between the rotation element of the planetary gear mechanism and the case 9. As the each brake, a wet multiple-disc brake is used, for instance. The each brake is engaged or disengaged by controlling a hydraulic pressure that is supplied to the each brake. When the brake is engaged, the rotation element of the planetary gear mechanism and the case 9 are brought into a coupling state, and the rotation element of the planetary gear mechanism is fixed to the case 9. Meanwhile, when the brake is disengaged, the coupling state between the rotation element of the planetary gear mechanism and the case 9 is canceled, and the rotation element of the planetary gear mechanism is no longer fixed to the case 9.

The first brake B1 can switch the coupling state between the sun gear S1 of the first planetary gear mechanism PG1 and the case 9. When the first brake B1 is engaged, the sun gear S1 of the first planetary gear mechanism PG1 is fixed to the case 9. Meanwhile, when the first brake B1 is disengaged, the sun gear S1 of the first planetary gear mechanism PG1 is no longer fixed to the case 9.

The second brake B2 can switch the coupling state between the carrier CA2 of the second planetary gear mechanism PG2 and the case 9. When the second brake B2 is engaged, the carrier CA2 of the second planetary gear mechanism PG2 is fixed to the case 9. Meanwhile, when the second brake B2 is disengaged, the carrier CA2 of the second planetary gear mechanism PG2 is no longer fixed to the case 9.

The each clutch can switch the coupling state between the rotation element of the planetary gear mechanism and the other rotation elements. The other rotation elements may include the input shaft A11 and the output shaft A12 in addition to the rotation elements of the planetary gear mechanism. As the each clutch, a wet multiple-disc clutch is used, for instance. The each clutch is engaged or disengaged by controlling a hydraulic pressure that is supplied to the each clutch. When the clutch is engaged, the rotation element of the planetary gear mechanism and the other rotation elements is brought into the coupling state, and the rotation speed of the rotation element of the planetary gear mechanism becomes equal to the rotation speeds of the other rotation elements. Meanwhile, when the clutch is disengaged, the coupling state between the rotation element of the planetary gear mechanism and the other rotation elements is canceled, and the power transmission between the rotation element of the planetary gear mechanism and the other rotation elements is blocked.

The first clutch C1 can switch the coupling state between the sun gear S2 of the second planetary gear mechanism PG2 and a combination of the sun gear S4 of the fourth planetary gear mechanism PG4 and the input shaft A11. When the first clutch C1 is engaged, the rotation speed of the sun gear S2 of the second planetary gear mechanism PG2 becomes equal to the rotation speeds of the sun gear S4 of the fourth planetary gear mechanism PG4 and the input shaft A11. Meanwhile, when the first clutch C1 is disengaged, the power transmission between the sun gear S2 of the second planetary gear mechanism. PG2 and the combination of the sun gear S4 of the fourth planetary gear mechanism PG4 and the input shaft A11 is blocked.

The second clutch C2 can switch the coupling state between a combination of the ring gear R1 of the first planetary gear mechanism PG1 and the sun gear S3 of the third planetary gear mechanism PG3, and the carrier CA2 of the second planetary gear mechanism PG2. When the second clutch C2 is engaged, the rotation speeds of the ring gear R1 of the first planetary gear mechanism PG1 and the sun gear S3 of the third planetary gear mechanism PG3 become equal to the rotation speed of the carrier CA2 of the second planetary gear mechanism PG2. Meanwhile, when the second clutch C2 is disengaged, the power transmission between the combination of the ring gear R1 of the first planetary gear mechanism PG1 and the sun gear S3 of the third planetary gear mechanism PG3, and the carrier CA2 of the second planetary gear mechanism PG2 is blocked.

The third clutch C3 can switch the coupling state between a combination of the carrier CA1 of the first planetary gear mechanism PG1 and the ring gear R2 of the second planetary gear mechanism PG2, and the ring gear R4 of the fourth planetary gear mechanism PG4. When the third clutch C3 is engaged, the rotation speeds of the carrier CA1 of the first planetary gear mechanism PG1 and the ring gear R2 of the second planetary gear mechanism PG2 become equal to the rotation speed of the ring gear R4 of the fourth planetary gear mechanism PG4. Meanwhile, when the third clutch C3 is disengaged, the power transmission between the combination of the carrier CA1 of the first planetary gear mechanism PG1 and the ring gear R2 of the second planetary gear mechanism PG2, and the ring gear R4 of the fourth planetary gear mechanism PG4 is blocked.

The fourth clutch C4 can switch the coupling state between the sun gear S2 of the second planetary gear mechanism PG2 and the carrier CA3 of the third planetary gear mechanism PG3. When the fourth clutch C4 is engaged, the rotation speed of the sun gear S2 of the second planetary gear mechanism PG2 becomes equal to the rotation speed of the carrier CA3 of the third planetary gear mechanism PG3. Meanwhile, when the fourth clutch C4 is disengaged, the power transmission between the sun gear S2 of the second planetary gear mechanism PG2 and the carrier CA3 of the third planetary gear mechanism PG3 is blocked.

The input shaft A11 and the case 9 may include oil passages. The hydraulic pressure used to drive the each coupling mechanism may be supplied from either one of the oil passage provided in the input shaft A11 and the oil passage provided in the case 9 to the each coupling mechanism. More specifically, the hydraulic pressure may be supplied from the oil passage provided in the input shaft 11 to the each coupling mechanism via a member that is interposed between the input shaft A11 and the each coupling mechanism. In addition, the hydraulic pressure may be supplied from the oil passage provided in the case 9 to the each coupling mechanism via a member that is interposed between the case 9 and the each coupling mechanism.

In the transmission 1, the shift stage is switched by switching the engaged state of the each coupling mechanism. In this way, the gear ratio of the transmission 1 is switched to the gear ratio that corresponds to the shift stage. The engaged state of the each coupling mechanism is switched by controlling the hydraulic pressure that is supplied to the each coupling mechanism.

FIG. 4 is a table illustrating the engaged state of the each coupling mechanism at the each shift stage in the transmission 1 according to the example. FIG. 5 is a table illustrating an instance of the gear ratio at the each shift stage in the transmission 1 according to the example. The gear ratio in the transmission 1, which is illustrated in FIG. 5, corresponds to a ratio of the rotation speed of the input shaft A11 to the rotation speed of the output shaft A12 at the each shift stage. FIG. 6 is a table illustrating an instance of step ratios between the adjacent shift stages in the transmission 1 according to the example. Each of the step ratios in the transmission 1, which is illustrated in FIG. 6, is a ratio of the gear ratio at the shift stage on a low speed stage side (in other words, a low gear side) of the adjacent shift stages to the gear ratio at the shift stage on a high speed stage side (in other words, a high gear side). The gear ratios and the step ratios in the transmission 1 have values in FIG. 5 and FIG. 6 when the gear ratios of the first planetary gear mechanism PG1, the second planetary gear mechanism PG2, the third planetary gear mechanism PG3, and the fourth planetary gear mechanism PG4 are respectively 0.56, 0.71, 0.38, and 0.41 as described above.

The each shift stage is realized by engaging four of the six coupling mechanisms and disengaging the other two coupling mechanisms.

A forward first speed stage (1st) is realized by engaging the second brake B2, the second clutch C2, the third clutch C3, and the fourth clutch C4. The gear ratio at the forward first speed stage (1st) is 4.71.

A forward second speed stage (2nd) is realized by engaging the first brake B1, the second brake B2, the second clutch C2, and the third clutch C3. The gear ratio at the forward second speed stage (2nd) is 3.45. In addition, the step ratio between the forward first speed stage (1st) and the forward second speed stage (2nd) is 1.37.

A forward third speed stage (3rd) is realized by engaging the first brake B1, the second clutch C2, the third clutch C3, and the fourth clutch C4. The gear ratio at the forward third speed stage (3rd) is 2.52. In addition, the step ratio between the forward second speed stage (2nd) and the forward third speed stage (3rd) is 1.37.

A forward fourth speed stage (4th) is realized by engaging the first brake B1, the first clutch C1, the second clutch C2, and the third clutch C3. The gear ratio at the forward fourth speed stage (4th) is 1.68. In addition, the step ratio between the forward third speed stage (3rd) and the forward fourth speed stage (4th) is 1.50.

A forward fifth speed stage (5th) is realized by engaging the first brake B1, the first clutch C1, the third clutch C3, and the fourth clutch C4. The gear ratio at the forward fifth speed stage (5th) is 1.13. In addition, the step ratio between the forward fourth speed stage (4th) and the forward fifth speed stage (5th) is 1.49.

A forward sixth speed stage (6th) is realized by engaging the first clutch C1, the second clutch C2, the third clutch C3, and the fourth clutch C4. The gear ratio at the forward sixth speed stage (6th) is 1.00. In addition, the step ratio between the forward fifth speed stage (5th) and the forward sixth speed stage (6th) is 1.13.

A forward seventh speed stage (7th) is realized by engaging the first brake B1, the first clutch C1, the second clutch C2, and the fourth clutch C4. The gear ratio at the forward seventh speed stage (7th) is 0.89. In addition, the step ratio between the forward sixth speed stage (6th) and the forward seventh speed stage (7th) is 1.12.

A forward eighth speed stage (8th) is realized by engaging the second brake B2, the first clutch C1, the second clutch C2, and the fourth clutch C4. The gear ratio at the forward eighth speed stage (8th) is 0.72. In addition, the step ratio between the forward seventh speed stage (7th) and the forward eighth speed stage (8th) is 1.24.

A forward ninth speed stage (9th) is realized by engaging the first brake B1, the second brake B2, the first clutch C1, and the fourth clutch C4. The gear ratio at the forward ninth speed stage (9th) is 0.55. In addition, the step ratio between the forward eighth speed stage (8th) and the forward ninth speed stage (9th) is 1.31.

A reverse stage (Rev) is realized by engaging the second brake B2, the first clutch C1, the second clutch C2, and the third clutch C3. The gear ratio at the reverse stage (Rev) is −4.60.

Just as described, the nine forward stages and the one reverse stage can be realized in the transmission 1. In addition, in the transmission 1, the adjacent shift stages share three of the four engaged coupling mechanisms. Accordingly, the each shift stage can be switched to the adjacent shift stage by switching one of the four engaged coupling mechanisms. Thus, the shift stage can be switched smoothly.

The vehicle speed sensor 201 detects a vehicle speed as a speed of the vehicle 10, and outputs a detection result.

The accelerator opening degree sensor 202 detects an accelerator opening degree of the vehicle 10, and outputs a detection result. The accelerator opening degree is a depressed amount of an accelerator pedal.

The acceleration sensor 203 detects acceleration generated in the vehicle 10, and outputs a detection result. For instance, a sensor capable of detecting three-directional acceleration is used as the acceleration sensor 203.

The control device 100 includes: a central processing unit (CPU) as an arithmetic processing unit; read only memory (ROM) as a storage element that stores programs, operation parameters, and the like used by the CPU; random access memory (RAM) as a storage element that temporarily stores parameters and the like, the parameters being appropriately changed during an operation of the CPU; and the like.

Figure 7:
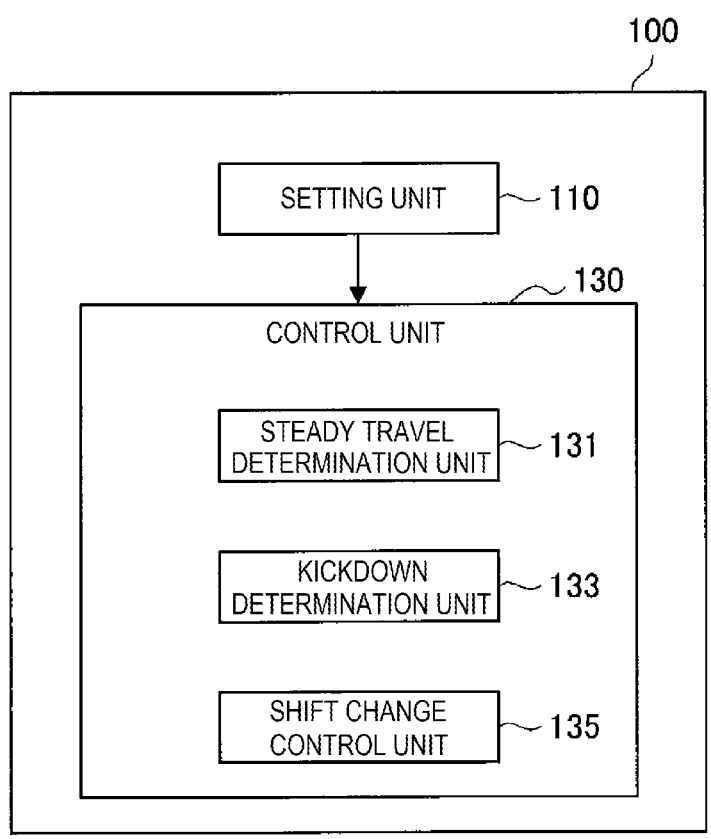
FIG. 7 is a block diagram illustrating an instance of a functional configuration of the control device according to the example.

FIG. 7 is a block diagram illustrating an instance of a functional configuration of the control device 100 according to the example. For instance, as illustrated in FIG. 7, the control device 100 includes a setting unit 110 and a control unit 130.

The setting unit 110 sets a shift change mode and outputs information indicative of the set shift change mode to the control unit 130. As the shift change mode, the setting unit 110 can set either one of a normal mode and a sport mode. In the sport mode, the speed of the engine 2 is maintained in a higher state than that in the normal mode. In the example, the normal mode may serve as a "first shift change mode", and the sport mode may serve as a "second shift change mode".

The setting unit 110 may be able to set another shift change mode that differs from the normal mode and the sport mode. For instance, the setting unit 110 may be able to set a manual mode in which the shift stage is switched in response to an upshift operation or a downshift operation by a driver. The vehicle 10 includes an input device (for instance, a lever or a button) that accepts the upshift operation and the downshift operation by the driver. Thus, the driver can perform either one of the upshift operation and the downshift operation by using the input device.

In order to facilitate understanding of the present invention, a description will hereinafter be made on an instance in which either one of the normal mode and the sport mode is set as the shift change mode.

For instance, as illustrated in FIG. 7, the control unit 130 includes a steady travel determination unit 131, a kickdown determination unit 133, and a shift change control unit 135.

The steady travel determination unit 131 determines whether the vehicle 10 travels steadily.

The kickdown determination unit 133 determines whether the driver of the vehicle 10 has performed a kickdown operation.

The shift change control unit 135 executes shift change control in which the gear ratio of the transmission 1 is automatically controlled on the basis of a travel state of the vehicle 10. More specifically, the shift change control unit 135 decides a target shift stage by using a map that defines a relationship between a combination of the vehicle speed and the accelerator opening degree, and the target shift stage. Then, the shift change control unit 135 switches the shift stage of the transmission 1 to the target shift stage, so as to control the gear ratio of the transmission 1. The shift change control unit 135 switches the engaged state of the each coupling mechanism by controlling the hydraulic pressure that is supplied to the each coupling mechanism of the transmission 1. In this way, the shift change control unit 135 can switch the shift stage of the transmission 1. The shift change control unit 135 according to the example executes the shift change control on the basis of the set shift change mode. In the shift change control, the shift stages as switching targets are the forward shift stages.

The control device 100 receives information output from the each device. The control device 100 communicates with the each device through controller area network (CAN) communication, for instance. For instance, the control device 100 receives the information that is output from the vehicle speed sensor 201, the accelerator opening degree sensor 202, and the acceleration sensor 203. The control device 100 also receives information on the driver's operation that is output from the input device provided in the vehicle 10. The functions of the control device 100 according to the example may be divided by a plurality of control devices, in which case the plurality of control devices may be coupled to each other via a communication bus such as the CAN.

The vehicle 10 may include a display device that shows information on the set shift change mode. In such a case, the control device 100 may control what is shown on the display device in accordance with the set shift change mode. For instance, the control device 100 may make the display device show the information on which shift change mode is set. When the normal mode is set, the control device 100 may not make the display device show the current shift stage in the transmission 1. Meanwhile, when the sport mode or the manual mode is set, the control device 100 may make the display device show the current shift stage in the transmission 1.

<2. Operation of Control Device>

Next, an operation of the control device 100 according to the example will be described with reference to FIG. 8 to FIG. 15.

Figure 8:
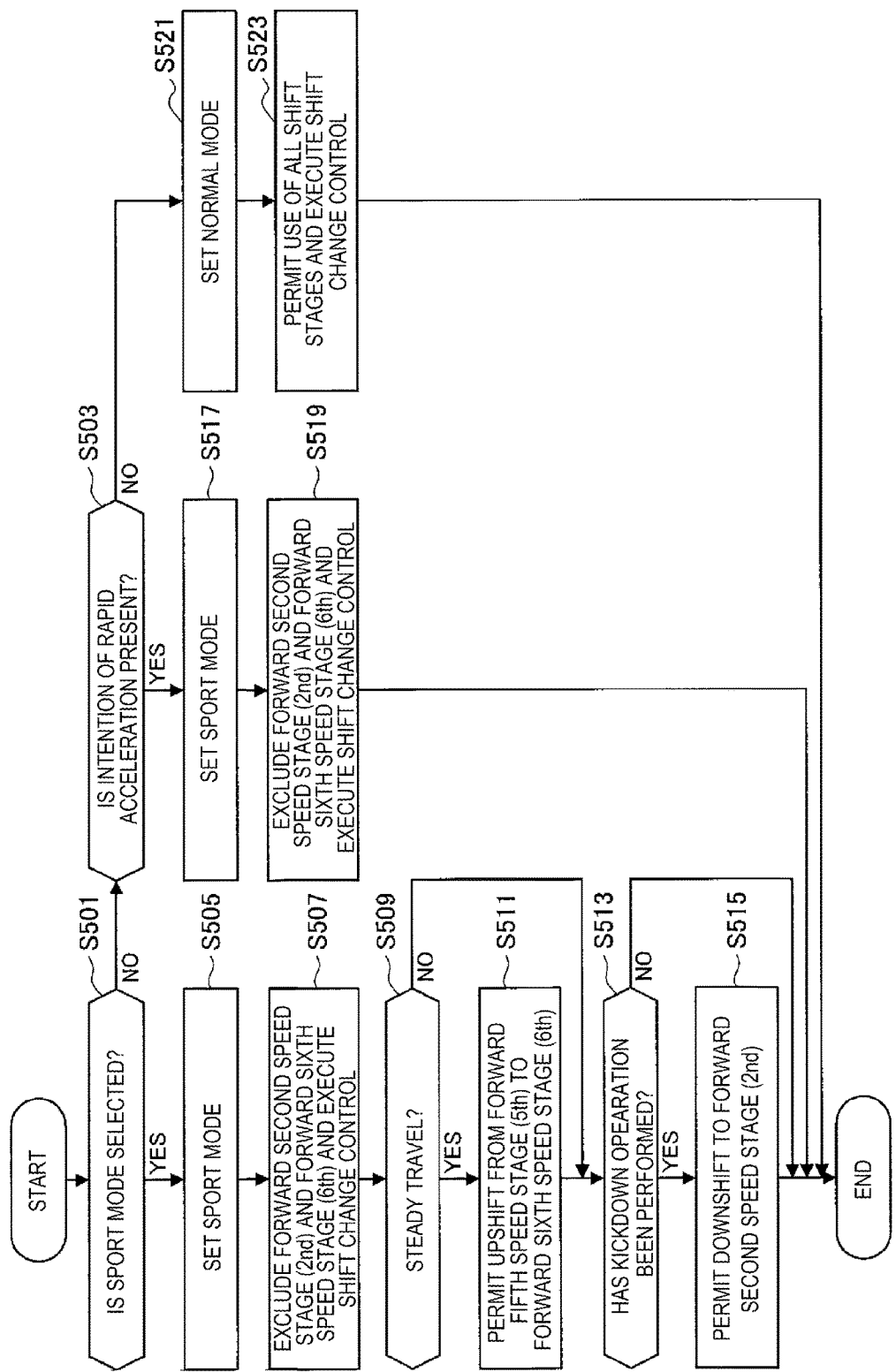
FIG. 8 is the flowchart illustrating an instance of a procedure executed by the control device according to the example.

FIG. 8 is the flowchart illustrating an instance of a procedure executed by the control device 100 according to the example. The control flow illustrated in FIG. 8 is repeated at predetermined time intervals, for instance.

Once the control flow illustrated in FIG. 8 is initiated, first in step S501, the setting unit 110 determines whether the sport mode is selected by the driver of the vehicle 10. If it is determined that the sport mode is selected by the driver of the vehicle 10 (step S501/YES), the processing proceeds to step S505. On the contrary, if it is determined that the sport mode is not selected by the driver of the vehicle 10 (step S501/NO), the processing proceeds to step S503. More specifically, the case where the determination result in step S501 is NO corresponds to a case where the normal mode is selected by the driver of the vehicle 10. The vehicle 10 includes an input device (for instance, a touch panel or a button) that accepts a selecting operation of the shift change mode by the driver. Thus, the driver can perform the selecting operation by using the input device.

In step S503, the setting unit 110 estimates whether the driver of the vehicle 10 has an intention of rapid acceleration. If it is estimated that the driver of the vehicle 10 has the intention of the rapid acceleration (step S503/YES), the processing proceeds to step S517. On the contrary, if the setting unit 110 estimates that the driver of the vehicle 10 has no intention of the rapid acceleration (step S503/NO), the processing proceeds to step S521. For instance, the setting unit 110 estimates whether the driver of the vehicle 10 has the intention of the rapid acceleration on the basis of the accelerator opening degree of the vehicle 10. More specifically, the setting unit 110 estimates that the driver has the intention of the rapid acceleration in the case where the accelerator opening degree of the vehicle 10 is larger than a first reference opening degree. For instance, the first reference opening degree has a value with which it may be determined whether a possibility that the driver has the intention of the rapid acceleration is high. The first reference opening degree may be stored in the storage element of the control device 100 in advance.

Hereinafter, a description will first be made on step S521 to step S523 as the operation of the control device 100 at the time when the normal mode is set. Then, a description will be made on step S505 to step S515 and step S517 to step S519 as the operation of the control device 100 at the time when the sport mode is set.

In step S521, the setting unit 110 sets the normal mode as the shift change mode. The normal mode is the shift change mode in which the speed of the engine 2 is maintained in a lower state than that in the sport mode. In the normal mode, since the speed of the engine 2 is maintained in the low state, fuel economy is improved.

Next, in step S523, the shift change control unit 135 permits use of all the multiple shift stages provided in the transmission 1, and executes the shift change control. More specifically, when the normal mode is set, the shift change control unit 135 executes the shift change control by using the map that defines the relationship between the combination of the vehicle speed and the accelerator opening degree, and the target shift stage such that the speed of the engine 2 is maintained in the lower state than that in the sport mode. The map, which is used by the shift change control unit 135 when the normal mode is set, is set such that the target shift stage is switched in an order of the forward first speed stage (1st), the forward second speed stage (2nd), the forward third speed stage (3rd), the forward fourth speed stage (4th), the forward fifth speed stage (5th), the forward sixth speed stage (6th), the forward seventh speed stage (7th), the forward eighth speed stage (8th), and the forward ninth speed stage (9th) along with an increase in the vehicle speed. In this way, the shift change control, for which the use of all the shift stages is permitted, is realized.

Figure 9:
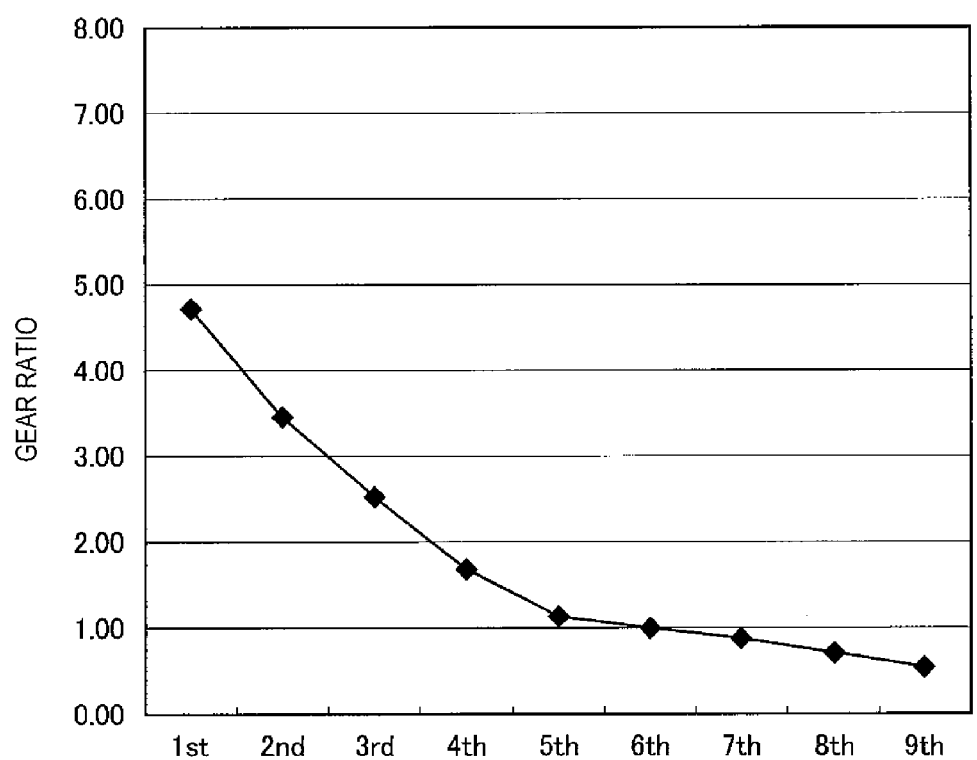
FIG. 9 is a view illustrating an instance of a graph in which the gear ratios at the shift stages are sequentially arranged from a low speed stage side, use of the shift stages being permitted in the case where a normal mode is set when shift change control according to the example is executed.
Figure 10:
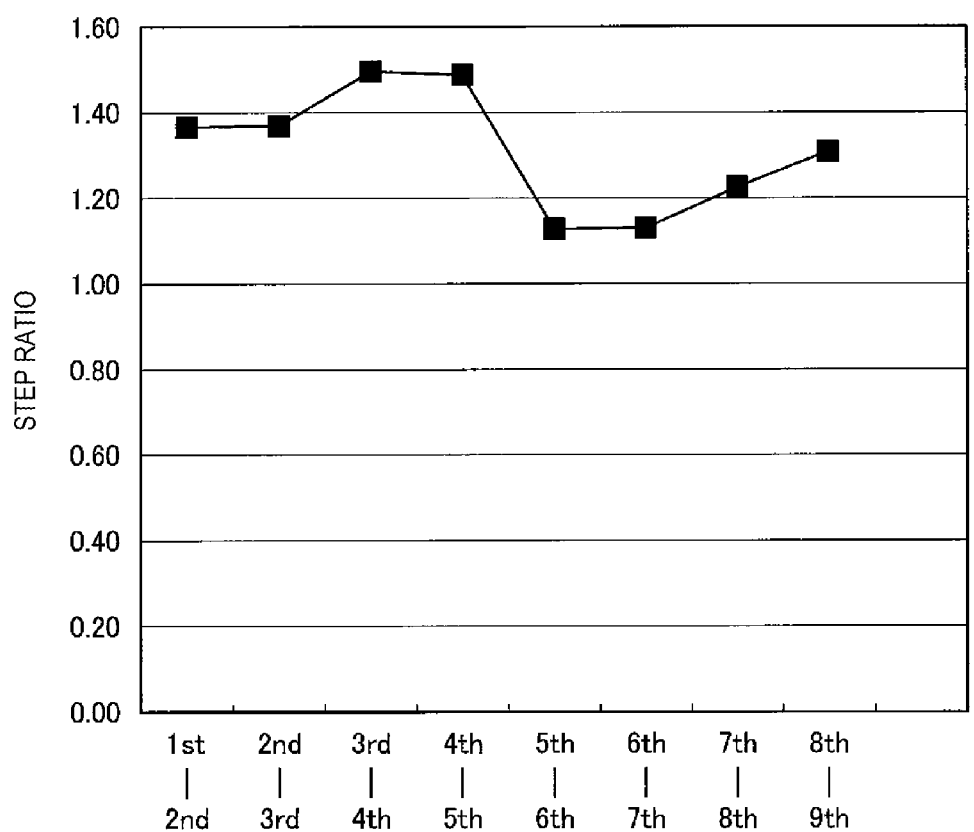
FIG. 10 is a view illustrating an instance of a graph in which the step ratios of the adjacent shift stages are sequentially arranged from the low speed stage side, the adjacent shift stages corresponding to the shift stages, the use of which is permitted in the case where the normal mode is set when the shift change control according to the example is executed.

FIG. 9 is a view illustrating an instance of a graph in which the gear ratios at the shift stages are sequentially arranged from a low speed stage side, the use of the shift stages being permitted in the case where the normal mode is set when the shift change control according to the example is executed. FIG. 10 is a view illustrating an instance of a graph in which the step ratios of the adjacent shift stages are sequentially arranged from the low speed stage side, the adjacent shift stages corresponding to the shift stages, the use of which is permitted in the case where the normal mode is set when the shift change control according to the example is executed. In the case where the shift stage on the low speed stage side of the two shift stages that correspond to one of the step ratios is lower than the shift stage on the low speed stage side of the two shift stages that correspond to another of the step ratios, the following description will be made with a premise that the one step ratio is positioned on the lower speed stage side than the other step ratio.

As described above, when the normal mode is set, the use of all the shift stages is permitted. Thus, as illustrated in FIG. 9 and FIG. 10, the shift stages, the use of which is permitted, are the forward first speed stage (1st), the forward second speed stage (2nd), the forward third speed stage (3rd), the forward fourth speed stage (4th), the forward fifth speed stage (5th), the forward sixth speed stage (6th), the forward seventh speed stage (7th), the forward eighth speed stage (8th), and the forward ninth speed stage (9th). The gear ratios at the shift stages, the use of which is permitted when the normal mode is set, are 4.71, 3.45, 2.52, 1.68, 1.13, 1.00, 0.89, 0.72, and 0.55 in this order from the low speed stage side, for instance. In addition, the step ratios of the adjacent shift stages are 1.37, 1.37, 1.50, 1.49, 1.13, 1.12, 1.24, 1.31 in this order from the low speed stage side, for instance, the adjacent shift stages corresponding to the shift stages, the use of which is permitted when the normal mode is set.

After step S523, the control flow illustrated in FIG. 8 is terminated.

In step S505, the setting unit 110 sets the sport mode as the shift change mode. The sport mode is the shift change mode in which the speed of the engine 2 is maintained in the higher state than that in the normal mode. In the sport mode, since the speed of the engine 2 is maintained in the high state, acceleration performance can be improved.

Next, in step S507, the shift change control unit 135 excludes the forward second speed stage (2nd) and the forward sixth speed stage (6th), for instance, as some of the multiple shift stages provided in the transmission 1, and executes the shift change control. More specifically, when the sport mode is set, the shift change control unit 135 executes the shift change control by using the map that defines the relationship between the combination of the vehicle speed and the accelerator opening degree, and the target shift stage such that the speed of the engine 2 is maintained in the higher state than that in the normal mode. The map, which is used by the shift change control unit 135 when the sport mode is set, is set such that the target shift stage is switched in an order of the forward first speed stage (1st), the forward third speed stage (3rd), the forward fourth speed stage (4th), the forward fifth speed stage (5th), the forward seventh speed stage (7th), the forward eighth speed stage (8th), and the forward ninth speed stage (9th) along with the increase in the vehicle speed, for instance. In this way, the shift change control for which the forward second speed stage (2nd) and the forward sixth speed stage (6th) are excluded, is realized.

Figure 11:
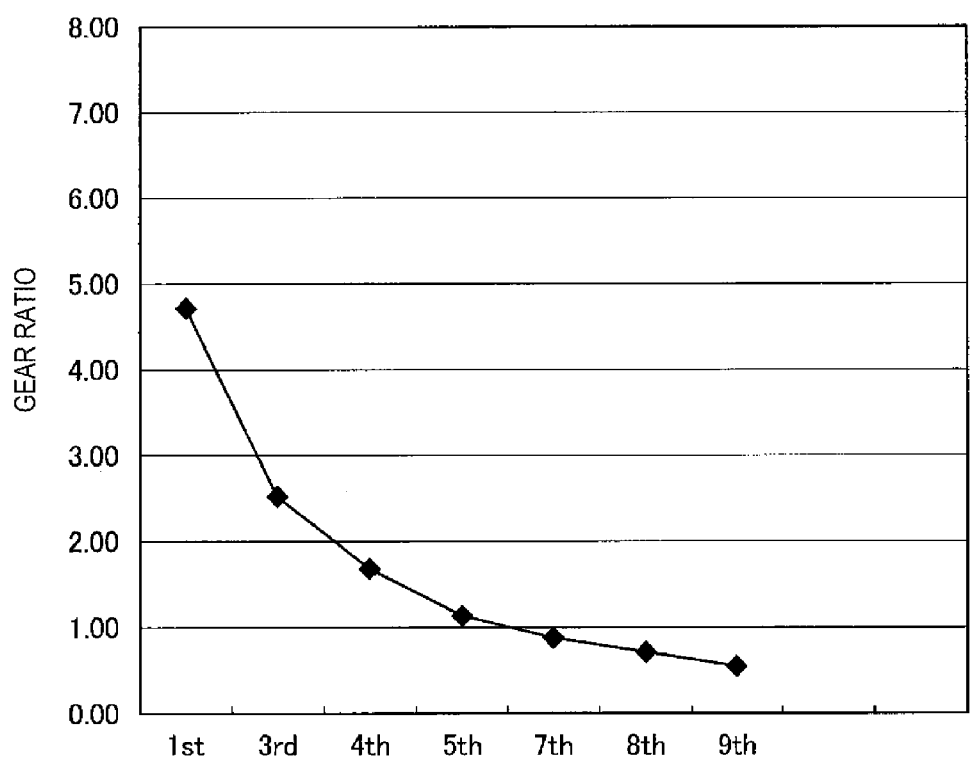
FIG. 11 is a view illustrating an instance of a graph in which the gear ratios at the shift stages are sequentially arranged from the low speed stage side, the use of the shift stages being permitted in the case where a sport mode is set when the shift change control according to the example is executed.
Figures 12, 13:
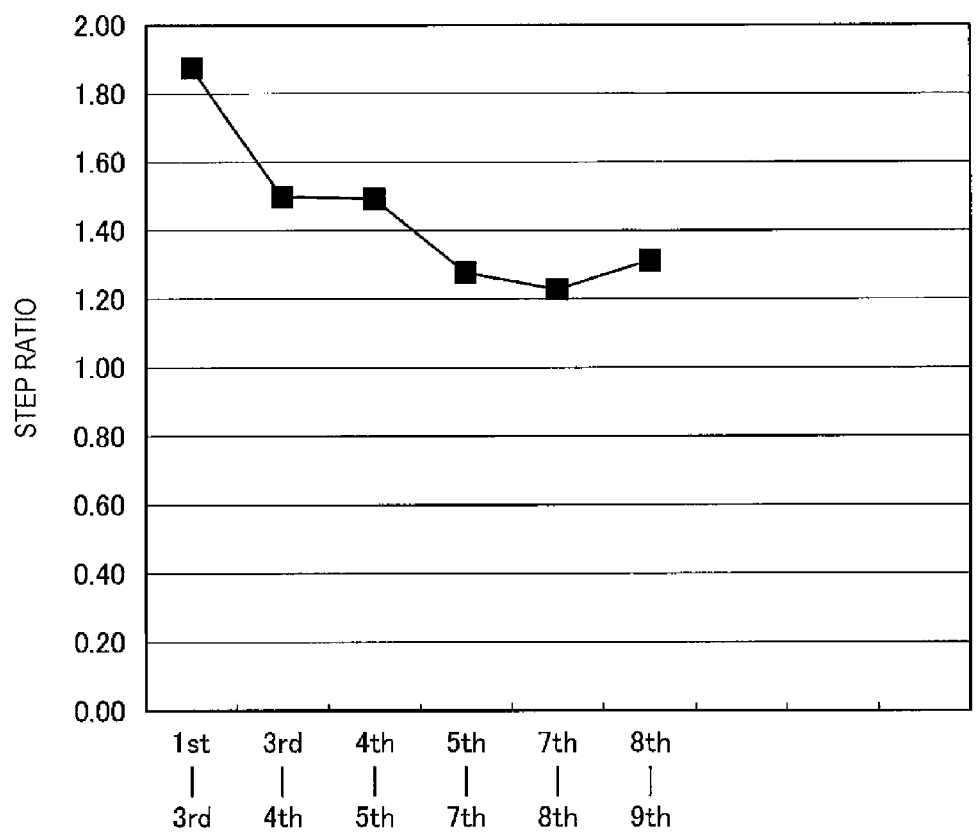
FIG. 12 is a view illustrating an instance of a graph in which the step ratios of the adjacent shift stages are sequentially arranged from the low speed stage side, the adjacent shift stages corresponding to the shift stages, the use of which is permitted in the case where the sport mode is set when the shift change control according to the example is executed.
FIG. 13 is a table illustrating an instance of the step ratios of the adjacent shift stages in the shift change control according to the example, the adjacent shift stages corresponding to the shift stages, the use of which is permitted when the sport mode is set.

FIG. 11 is a view illustrating an instance of a graph in which the gear ratios at the shift stages are sequentially arranged from the low speed stage side, the use of the shift stages being permitted in the case where the sport mode is set when the shift change control according to the example is executed. FIG. 12 is a view illustrating an instance of a graph in which the step ratios of the adjacent shift stages are sequentially arranged from the low speed stage side, the adjacent shift stages corresponding to the shift stages, the use of which is permitted in the case where the sport mode is set when the shift change control according to the example is executed. FIG. 13 is a table illustrating an instance of the step ratios of the adjacent shift stages in the shift change control according to the example, the adjacent shift stages corresponding to the shift stages, the use of which is permitted when the sport mode is set.

More specifically, when the sport mode is set, the shift change control unit 135 excludes some of the shift stages as follows. Of the step ratios of the adjacent shift stages that corresponding to the shift stages whose use is permitted, the number of the step ratios that have higher values than the adjacent step ratios on the low speed stage side becomes smaller than that in the case where none of the shift stages is excluded.

For instance, when the sport mode is set, the shift change control unit 135 excludes some of the shift stages as follows. Of the step ratios of the adjacent shift stages that correspond to the shift stages whose use is permitted when none of the shift stages is excluded, the step ratio that has the higher value than the adjacent step ratio on the low speed stage side is selected. Then, the shift stage on the low speed stage side that is adjacent to the shift stage on the low speed stage side of the two shift stages corresponding to the step ratio with the higher value is excluded.

More specifically, as illustrated in FIG. 10, when the normal mode, in which none of the shift stages is excluded, is set, the step ratio between the forward third speed stage (3rd) and the forward fourth speed stage (4th) has the higher value than the step ratio between the forward second speed stage (2nd) and the forward third speed stage (3rd) that is the adjacent step ratio on the low speed stage side. Of the two shift stages that correspond to the step ratio between the forward third speed stage (3rd) and the forward fourth speed stage (4th), the forward third speed stage (3rd) corresponds to the shift stage on the low speed stage side. Thus, as described above, the shift change control unit 135 may exclude the forward second speed stage (2nd) that is the adjacent shift stage on the low speed stage side of the forward third speed stage (3rd).

In addition, as illustrated in FIG. 10, when the normal mode, in which none of the shift stages is excluded, is set, the step ratio between the forward seventh speed stage (7th) and the forward eighth speed stage (8th) has the higher value than the step ratio between the forward sixth speed stage (6th) and the forward seventh speed stage (7th) that is the adjacent step ratio on the low speed stage side. Of the two shift stages that correspond to the step ratio between the forward seventh speed stage (7th) and the forward eighth speed stage (8th), the forward seventh speed stage (7th) corresponds to the shift stage on the low speed stage side. Thus, as described above, the shift change control unit 135 may exclude the forward sixth speed stage (6th) that is the adjacent shift stage on the low speed stage side of the forward seventh speed stage (7th).

In the case where the forward second speed stage (2nd) and the forward sixth speed stage (6th) are excluded when the sport mode is set, as illustrated in FIG. 11 and FIG. 12, the shift stages, the use of which is permitted, are the forward first speed stage (1st), the forward third speed stage (3rd), the forward fourth speed stage (4th), the forward fifth speed stage (5th), the forward seventh speed stage (7th), the forward eighth speed stage (8th), and the forward ninth speed stage (9th). The gear ratios at the shift stages, the use of which is permitted when the sport mode is set, are 4.71, 2.52, 1.68, 1.13, 0.89, 0.72, and 0.55 in this order from the low speed stage side, for instance. For instance, as illustrated in FIG. 13, the step ratio between the forward first speed stage (1st) and the forward third speed stage (3rd) is 1.87. In addition, for instance, as illustrated in FIG. 13, the step ratio between the forward fifth speed stage (5th) and the forward seventh speed stage (7th) is 1.27. Thus, the step ratios of the adjacent shift stages that correspond to the shift stages whose use is permitted when the sport mode is set are 1.87, 1.50, 1.49, 1.27, 1.24, and 1.31 in this order from the low speed stage side, for instance.

As illustrated in FIG. 10, in the normal mode, in which none of the shift stages is excluded, the following step ratios of the adjacent shift stages, which correspond to the shift stages whose use is permitted, have the higher values than the adjacent step ratios on the low speed stage side: the step ratio between the forward third speed stage (3rd) and the forward fourth speed stage (4th); the step ratio between the forward seventh speed stage (7th) and the forward eighth speed stage (8th); and the step ratio between the forward eighth speed stage (8th) and the forward ninth speed stage (9th). Thus, in the normal mode, in which none of the shift stages is excluded, of the step ratios of the adjacent shift stages that correspond to the shift stages whose use is permitted, the number of the step ratios that have the higher values than the adjacent step ratios on the low speed stage side is three.

Meanwhile, as illustrated in FIG. 12, of the step ratios of the adjacent shift stages that correspond to the shift stages whose use is permitted when the sport mode is set, the step ratio that has the higher value than the adjacent step ratio on the low speed stage side is only the step ratio between the forward eighth speed stage (8th) and the forward ninth speed stage (9th). Thus, of the step ratios of the adjacent shift stages that corresponds to the shift stages whose use is permitted when the sport mode is set, the number of the step ratios that have the higher values than the adjacent step ratios on the low speed stage side is one.

Therefore, of the step ratios of the adjacent shift stages that correspond to the shift stages whose use is permitted when the sport mode is set, the number of the step ratios that have the higher values than the adjacent step ratios on the low speed stage side is smaller than that when the normal mode, in which none of the shift stages is excluded, is set.

Next, in step S509, the steady travel determination unit 131 determines whether the vehicle 10 travels steadily. If it is determined that the vehicle 10 travels steadily (step S509/YES), the processing proceeds to step S511. On the contrary, if it is determined that the vehicle 10 does not travel steadily (step S509/NO), the processing proceeds to step S513. More specifically, the steady travel means travel on a travel road with none of or a mild road surface gradient in a state where a temporal variation in the vehicle speed is small. For instance, the steady travel determination unit 131 determines whether the vehicle 10 travels steadily on the basis of the road surface gradient and the vehicle speed. More specifically, the steady travel determination unit 131 determines that the vehicle 10 travels steadily in the case where the following state continues at least for a reference duration: the road surface gradient is milder than a reference gradient, and the temporal variation in the vehicle speed is smaller than a reference variation. For instance, the steady travel determination unit 131 may compute a pitch angle as the road surface gradient on the basis of the acceleration generated in the vehicle 10. The pitch angle is an angle at which the vehicle 10 is tilted in a pitch direction. For instance, the reference gradient has a value with which it may be determined whether the gradient of the road surface on which the vehicle 10 is located is mild. The reference gradient may be stored in the storage element of the control device 100 in advance. For instance, the reference variation has a value with which it may be determined whether the temporal variation in the vehicle speed is small. The reference variation may be stored in the storage element of the control device 100 in advance. The reference duration has a value that may appropriately be set, and may be stored in the storage element of the control device 100 in advance.

A method of determining whether the vehicle 10 travels steadily is not limited to the above instance. For instance, the steady travel determination unit 131 may determine whether the vehicle 10 travels steadily on the basis of either one of the acceleration of the vehicle 10 and presence or absence of the brake operation.

In step S511, the shift change control unit 135 permits an upshift from the forward fifth speed stage (5th) to the forward sixth speed stage (6th). The forward sixth speed stage (6th) is one of the shift stages that are excluded in step S507, and the forward fifth speed stage (5th) is the adjacent shift stage on the low speed stage side of the forward sixth speed stage (6th). In the example, the forward sixth speed stage (6th) may serve as a "first shift stage". More specifically, the first shift stage is the adjacent shift stage on the high speed stage side of the shift stage (for instance, the forward fifth speed stage (5th)), a possibility of the use of which during the steady travel is high. For instance, in the cases where the vehicle 10 travels steadily at the forward fifth speed stage (5th) and the speed of the engine 2 is higher than a reference speed, the shift change control unit 135 may permit the upshift from the forward fifth speed stage (5th) to the forward sixth speed stage (6th). For instance, the reference speed has a value with which it may be determined whether the speed of the engine 2 is high in such a degree to give the driver of the vehicle 10 the sense of discomfort. The reference speed may be stored in the storage element of the control device 100 in advance. The case where the speed of the engine 2 is higher than the reference speed can also be considered as a case where the driver receives such a sense of discomfort that the fuel economy worsens.

Next, in step S513, the kickdown determination unit 133 determines whether the kickdown operation has been performed by the driver of the vehicle 10. If it is determined that the kickdown operation has been performed (step S513/YES), the process proceeds to step S515. On the contrary, if it is determined that the kickdown operation has not been performed (step S513/NO), the control flow in FIG. 8 is terminated. For instance, the kickdown determination unit 133 determines whether the kickdown operation has been performed on the basis of the accelerator opening degree of the vehicle 10. More specifically, in the cases where the shift stage is the shift stage on the high speed stage side of the forward first speed stage (1st) and where the accelerator opening degree of the vehicle 10 is larger than a second reference opening degree, the kickdown determination unit 133 determines that the kickdown operation has been performed. For instance, the second reference opening degree has a value that is appropriately set on the basis of a design specification of the vehicle 10 and the like, and may be stored in the storage element of the control device 100 in advance. The second reference opening degree may or may not match the first reference opening degree described above.

In step S515, the shift change control unit 135 permits a downshift from the shift stage on the high speed stage side of the forward second speed stage (2nd) to the forward second speed stage (2nd). The shift stage on the high speed stage side of the forward second speed stage (2nd) is one of the shift stages, the use of which is permitted in step S507. In the example, the forward second speed stage (2nd) may serve as a "second shift stage". More specifically, the second shift stage is the shift stage on the low speed stage side of the shift stages that are excluded in step S507. For instance, in the case where the kickdown operation is performed at the forward third speed stage (3rd), the shift change control unit 135 may permit the downshift from the forward third speed stage (3rd) to the forward second speed stage (2nd).

After step S515, the control flow illustrated in FIG. 8 is terminated.

In step S517, the setting unit 110 sets the sport mode as the shift change mode.

Next, similar to step S507, in step S519, the shift change control unit 135 excludes the forward second speed stage (2nd) and the forward sixth speed stage (6th), for instance, as some of the multiple shift stages provided in the transmission 1, and executes the shift change control.

After step S519, the control flow illustrated in FIG. 8 is terminated.

As described above, the setting unit 110 sets the shift change mode on the basis of the determination result in step S501, for instance. Just as described, the setting unit 110 may set the shift change mode in accordance with the selecting operation of the shift change mode by the driver of the vehicle 10. In addition, as described above, the setting unit 110 sets the shift change mode on the basis of the estimation result in step S503, for instance. Just as described, the setting unit 110 may set the shift change mode in accordance with the estimation result of the presence or the absence of the intention of the rapid acceleration by the driver of the vehicle 10.

Next, a description will be made on a relationship between the speed of the engine 2 and the vehicle speed in the cases where the shift change control according to a reference example is executed and where the shift change control according to the example is executed.

Figure 14:
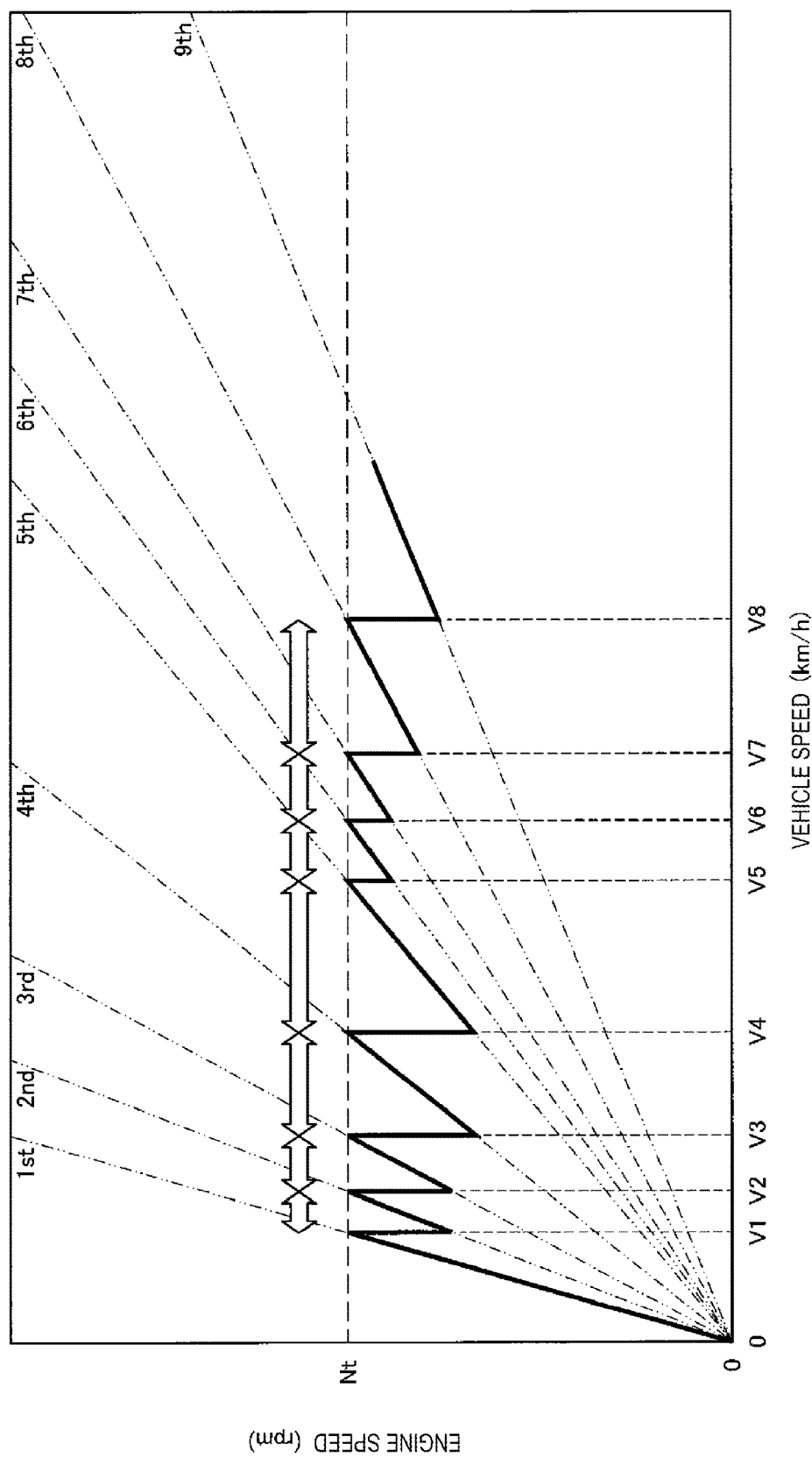
FIG. 14 is a graph illustrating an instance of a relationship between an engine speed and a vehicle speed in the case where a sport mode is set when shift change control according to a reference example is executed.
Figure 15:
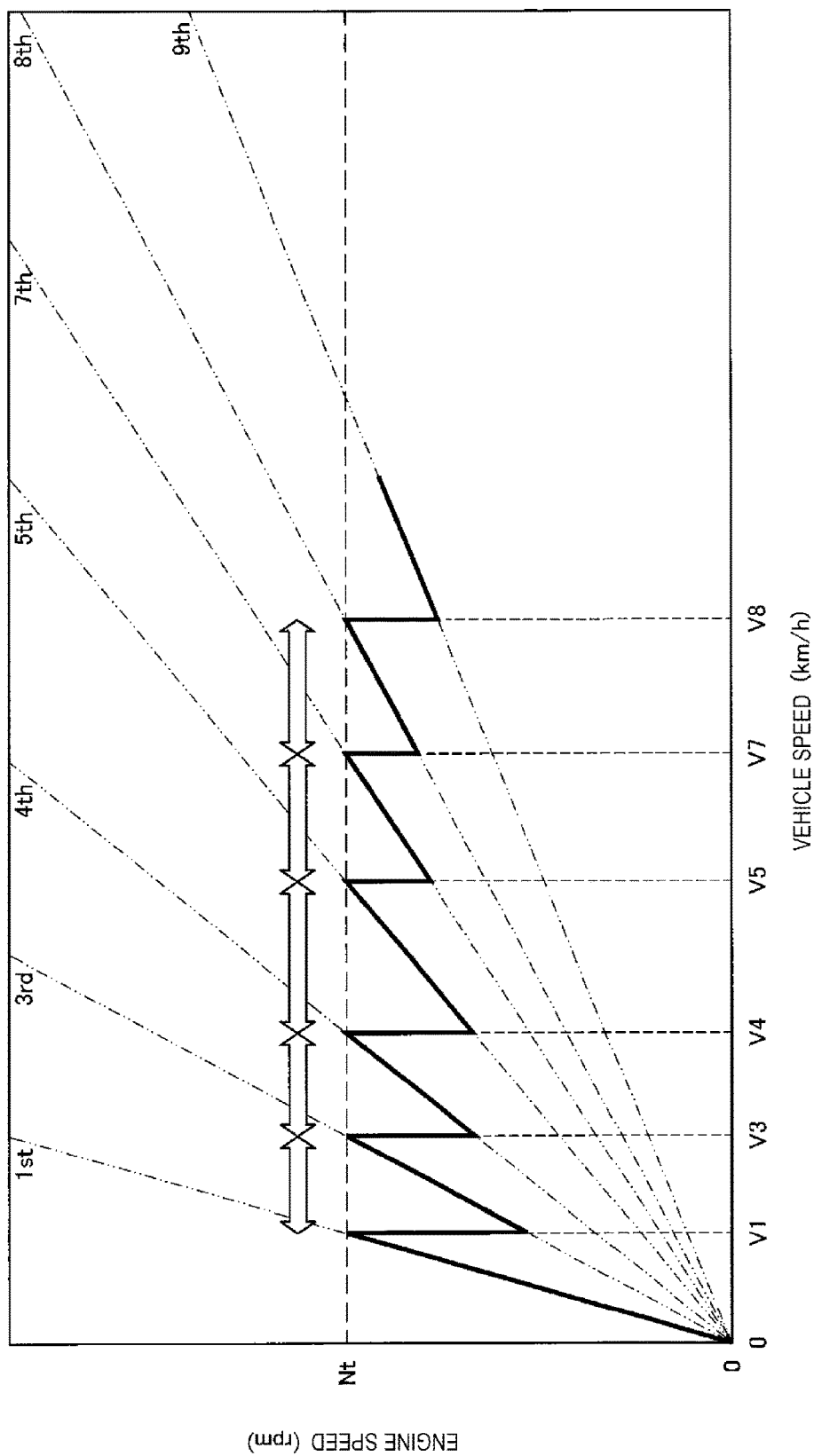
FIG. 15 is a graph illustrating an instance of the relationship between the engine speed and the vehicle speed in the case where the sport mode is set when the shift change control according to the example is executed.

FIG. 14 is a graph illustrating an instance of the relationship between the speed of the engine 2 and the vehicle speed in the case where the sport mode is set when the shift change control according to the reference example is executed. FIG. 15 is a graph illustrating an instance of the relationship between the speed of the engine 2 and the vehicle speed in the case where the sport mode is set when the shift change control according to the example is executed. FIG. 14 and FIG. 15 each illustrate transmission characteristic lines by two-dot chain lines. The transmission characteristic lines each represent the relationship between the speed of the engine 2 and the vehicle speed in the case where the gear ratio of the transmission 1 is fixed to the gear ratio at the each shift stage, the use of which is permitted when the sport mode is set.

The reference example differs from the example in a point that the use of all the multiple shift stages provided in the transmission 1 is permitted for the execution of the shift change control when the sport mode is set. Accordingly, in the case where the sport mode is set when the shift change control according to the reference example is executed, the shift stages, the use of which is permitted, are the forward first speed stage (1st), the forward second speed stage (2nd), the forward third speed stage (3rd), the forward fourth speed stage (4th), the forward fifth speed stage (5th), the forward sixth speed stage (6th), the forward seventh speed stage (7th), the forward eighth speed stage (8th), and the forward ninth speed stage (9th).

In the reference example, similar to the example, the speed of the engine 2 is maintained in the high state in the sport mode. For instance, in the sport mode, the shift change control is executed such that the upshift is performed when the speed of the engine 2 becomes an upper limit speed Nt that is a high speed.

In the reference example, when the vehicle 10 starts, the shift stage is first set at the forward first speed stage (1st). Thus, as illustrated in FIG. 14, along with the acceleration, the speed of the engine 2 is increased on the transmission characteristic line that corresponds to the forward first speed stage (1st). Then, when the vehicle speed reaches a speed V1, the speed of the engine 2 becomes the upper limit speed Nt, and the shift stage is upshifted from the forward first speed stage (1st) to the forward second speed stage (2nd). Next, along with the acceleration, the speed of the engine 2 is increased on the transmission characteristic line that corresponds to the forward second speed stage (2nd). Then, when the vehicle speed reaches a speed V2, the speed of the engine 2 becomes the upper limit speed Nt, and the shift stage is upshifted from the forward second speed stage (2nd) to the forward third speed stage (3rd). Thereafter, along with the acceleration, the speed of the engine 2 is repeatedly increased in a similar manner, and the upshift is repeatedly performed in a similar manner. More specifically, when the vehicle speed reaches each of the speed V1, the speed V2, a speed V3, a speed V4, a speed V5, a speed V6, a speed V7, and a speed V8, the speed of the engine 2 becomes the upper limit speed Nt. In this way, the shift stage is upshifted to the adjacent shift stage on the high speed stage side. In this way, the speed of the engine 2 is maintained in the high state.

In the reference example, an interval between the adjacent vehicle speeds, at each of which the upshift is performed, is unequal. More specifically, as illustrated in FIG. 14, the interval between the speed V1 and the speed V2, the interval between the speed V2 and the speed V3, and the interval between the speed V5 and the speed V6, and the interval between the speed V6 and the speed V7 are short. Meanwhile, the interval between the speed V3 and the speed V4, the interval between the speed V4 and the speed V5, and the interval between the speed V7 and the speed V8 are longer than those intervals.

In the reference example, the interval between the adjacent vehicle speeds, at each of which the upshift is performed, is unequal. Thus, for instance, in the case where the vehicle 10 accelerates at the constant acceleration, a period from a time point of the upshift to a time point of the next upshift becomes unequal. More specifically, a period from a time point of the upshift to the forward second speed stage (2nd) to a time point of the upshift to the forward third speed stage (3rd) is likely to be shorter than a period from the time point of the upshift to the forward third speed stage (3rd) to a time point of the upshift to the forward fourth speed stage (4th). In addition, a period from a time point of the upshift to the forward fourth speed stage (4th) to a time point of the upshift to the forward fifth speed stage (5th) is likely to be longer than a period from the time point of the upshift to the forward fifth speed stage (5th) to a time point of the upshift to the forward sixth speed stage (6th).

The period from the time point of the upshift to the time point of the next upshift is unequal, just as described. Thus, the shift stage is likely to be changed at different timing from the driver's intended timing. In particular, in the sport mode, in which the speed of the engine 2 is maintained in the high state, the period from the time point of the upshift to the time point of the next upshift significantly varies in comparison with that in the normal mode. Thus, the shift change timing is likely to deviate from the driver's intended timing. In this way, the driver may receive the sense of discomfort.

Meanwhile, in the example, as described above, when the sport mode is set, some (for instance, the forward second speed stage (2nd) and the forward sixth speed stage (6th)) of the multiple shift stages provided in the transmission 1 are excluded for the execution of the shift change control. Accordingly, in the case where the sport mode is set when the shift change control according to the example is executed, the shift stages, the use of which is permitted, are the forward first speed stage (1st), the forward third speed stage (3rd), the forward fourth speed stage (4th), the forward fifth speed stage (5th), the forward seventh speed stage (7th), the forward eighth speed stage (8th), and the forward ninth speed stage (9th), for instance.

In the example, when the vehicle 10 starts, the shift stage is first set at the forward first speed stage (1st). Thus, as illustrated in FIG. 15, along with the acceleration, the speed of the engine 2 is increased on the transmission characteristic line that corresponds to the forward first speed stage (1st). Then, when the vehicle speed reaches the speed V1, the speed of the engine 2 becomes the upper limit speed Nt, and the shift stage is upshifted from the forward first speed stage (1st) to the forward third speed stage (3rd). Next, along with the acceleration, the speed of the engine 2 is increased on the transmission characteristic line that corresponds to the forward third speed stage (3rd). Then, when the vehicle speed reaches the speed V3, the speed of the engine 2 becomes the upper limit speed Nt, and the shift stage is upshifted from the forward third speed stage (3rd) to the forward fourth speed stage (4th). Thereafter, along with the acceleration, the speed of the engine 2 is repeatedly increased in a similar manner, and the upshift is repeatedly performed in a similar manner. More specifically, when the vehicle speed reaches each of the speed V1, the speed V3, the speed V4, the speed V5, the speed V7, and the speed V8, the speed of the engine 2 becomes the upper limit speed Nt. In this way, the shift stage is upshifted to the adjacent shift stage on the high speed stage side. In this way, the speed of the engine 2 is maintained in the high state.

In regard to the step ratios of the adjacent shift stages that correspond to the shift stages whose use is permitted, as the tendency of the step ratio on the higher speed stage side having a smaller value is increased, the interval between the adjacent vehicle speeds, at each of which the upshift is performed, is likely to become equal. More specifically, in the example, as described above, when the sport mode is set, some of the shift stages are excluded as follows. Of the step ratios of the adjacent shift stages that correspond to the shift stages whose use is permitted, the number of the step ratios that have the higher values than the adjacent step ratios on the low speed stage side becomes smaller than that in the case where none of the shift stages is excluded. In this way, in regard to the step ratios of the adjacent shift stages that correspond to the shift stages whose use is permitted when the sport mode is set, the tendency of the step ratio on the higher speed stage side having the smaller value is increased when compared to that in the reference example, for instance.

Therefore, in the example, the interval between the adjacent vehicle speeds, at each of which the upshift is performed, becomes equal when compared to the reference example, for instance. More specifically, as illustrated in FIG. 15, the interval between the speed V1 and the speed V3, the interval between the speed V3 and the speed V4, the interval between the speed V4 and the speed V5, the interval between the speed V5 and the speed V7, and the interval between the speed V7 and the speed V8 become relatively equal.

In regard to the step ratios of the adjacent shift stages that correspond to the shift stages whose use is permitted when none of the shift stages is excluded, the step ratios each depend on a setting value of the gear ratio at each of all the shift stages provided in the transmission 1. Accordingly, in regard to the step ratios of the adjacent shift stages that correspond to the shift stages whose use is permitted, the tendency of the step ratio on the higher speed stage side having the smaller value may be decreased due to the setting value of the gear ratio at each of all the shift stages provided in the transmission 1. As a result, the interval between the adjacent vehicle speeds, at each of which the upshift is performed, becomes unequal as in the reference example, for instance. Thus, the period from the time point of the upshift to the time point of the next upshift may become unequal.

<3. Effects of Control Device>

Next, effects of the control device 100 according to the example will be described.

When the second shift change mode, in which the speed of the engine 2 is maintained in the higher state than that in the first shift change mode, is set as the shift change mode, the control device 100 according to the example executes the shift change control in which some of the multiple shift stages provided in the transmission 1 are excluded. In this way, in regard to the step ratios of the adjacent shift stages that correspond to the shift stages whose use is permitted when second shift change mode is set, the tendency of the step ratio on the higher speed stage side having the smaller value can be increased. This configuration can eliminate or minimize the unequal interval between the adjacent vehicle speeds, at each of which the upshift is performed. Thus, for instance, when the vehicle 10 accelerates at the constant acceleration, this configuration can eliminate or minimize the unequal period from the time point of the upshift to the time point of the next upshift. This configuration can further eliminate or minimize the shift change at the different timing from the driver's intended timing. Thus, in the case where the second shift change mode, in which the speed of the engine 2 is maintained in the high state, is set, this configuration can eliminate or minimize a chance of giving the driver the sense of discomfort. Therefore, the drivability improves in the vehicle 10 on which the transmission 1 with the multiple shift stages is mounted.

When the second shift change mode is set, the control device 100 may exclude some of the shift stages as follows. Of the step ratios of the adjacent shift stages that correspond to the shift stages whose use is permitted, the number of the step ratios on the high speed stage side that have higher values than the adjacent step ratios on the low speed stage side becomes smaller than that in the case where none of the shift stages is excluded. In this way, in regard to the step ratios of the adjacent shift stages that correspond to the shift stages whose use is permitted when second shift change mode is set, the tendency of the step ratio on the higher speed stage side having the smaller value can effectively be increased.

When the second shift change mode is set, the control device 100 may exclude some of the shift stages as follows. Of the step ratios of the adjacent shift stages that correspond to the shift stages whose use is permitted when none of the shift stages is excluded, the step ratio that has the higher value than the step ratio on the low speed stage side is selected. Then, the shift stage on the low speed stage side that is adjacent to the shift stage on the low speed stage side of the two shift stages corresponding to the step ratio with the higher value is excluded. In this way, of the step ratios of the adjacent shift stages that correspond to the shift stages whose use is permitted when the second shift change mode is set, the number of the step ratios on the high speed stage side that have the higher values than the step ratios on the low speed stage side can effectively be decreased when compared to the case where none of the shift stages is excluded.

When it is determined that the driver of the vehicle 10 has selected the second shift change mode, the control device 100 can set the second shift change mode as the shift change mode. In this way, the second shift change mode can appropriately be set as the shift change mode in accordance with the selecting operation of the shift change mode by the driver.

In the case where it is determined that the vehicle 10 travels steadily when the second shift change mode is set in accordance with the selecting operation by the driver of the vehicle 10, the control device 100 may permit the upshift from the shift stage to the first shift stage. The shift stage is one of the excluded shift stages and is the adjacent shift stage on the low speed stage side of the first shift stage. For instance, in the cases where the vehicle 10 travels steadily at the adjacent shift stage on the low speed stage side (for instance, the forward fifth speed stage (5th)) of the first shift stage and where the speed of the engine 2 is higher than the reference speed, the control device 100 can perform the upshift to the first shift stage (for instance, the forward sixth speed stage (6th)). Thus, when the speed of the engine 2 is high in such a degree to give the driver of the vehicle 10 the sense of discomfort, the speed of the engine 2 is decreased, which can eliminate or minimize the chance of giving the driver the sense of discomfort. Furthermore, this configuration can eliminate or minimize an excessive decrease in the speed of the engine 2 when compared to a case where the shift stage is upshifted from the adjacent shift stage on the low speed stage side (for instance, the forward fifth speed stage (5th)) of the first shift stage to the adjacent shift stage on the high speed stage side (for instance, the forward seventh speed stage (7th)) of the first shift stage. Therefore, this configuration can eliminate or minimize excessive degradation of the acceleration performance.

The control device 100 may determine whether the vehicle 10 travels steadily on the basis of the road surface gradient and the vehicle speed. In this way, the control device 100 can appropriately determine whether the vehicle 10 travels steadily.

In the case where it is determined that the driver of the vehicle 10 has performed the kickdown operation when the second shift change mode is set in accordance with the selecting operation by the driver of the vehicle 10, the control device 100 may permit the downshift from the shift stage to the second shift stage. The shift stage is one of the excluded shift stages and is the shift stage on the high speed stage side of the second shift stage. For instance, in the cases where the kickdown operation is performed at the shift stage on the high speed stage side (for instance, the forward third speed stage (3rd)) of the second shift stage, the control device 100 can perform the downshift to the second shift stage (for instance, the forward second speed stage (2nd)). Thus, this configuration can eliminate or minimize an excessive increase in the speed of the engine 2 when compared to a case where the shift stage is changed from the shift stage on the high speed stage side (for instance, the forward third speed stage (3rd)) of the second shift stage to the adjacent shift stage on the low speed stage side (for instance, the forward first speed stage (1st)) of the second shift stage. Therefore, this configuration can eliminate or minimize the chance of giving the driver the sense of discomfort.

The control device 100 may determine whether the driver of the vehicle 10 has performed the kickdown operation on the basis of the accelerator opening degree of the vehicle 10. In this way, the control device 100 can appropriately determine whether the kickdown operation has been performed.

When it is estimated that the driver of the vehicle 10 has the intention of the rapid acceleration, the control device 100 may set the second shift change mode as the shift change mode. In this way, the second shift change mode can appropriately be set as the shift change mode in accordance with the estimation result of the presence or the absence of the driver's intention of the rapid acceleration.

The control device 100 may estimate whether the driver of the vehicle 10 has the intention of the rapid acceleration on the basis of the accelerator opening degree of the vehicle 10. In this way, the control device 100 can appropriately estimate whether the driver has the intention of the rapid acceleration.

<4. Conclusion>

As it has been described so far, according to the example, when the second shift change mode, in which the speed of the engine 2 is maintained in the higher state than that in the first shift change mode, is set as the shift change mode, the shift change control in which some of the multiple shift stages provided in the transmission 1 are excluded is executed. In this way, in regard to the step ratios of the adjacent shift stages that correspond to the shift stages whose use is permitted when second shift change mode is set, the tendency of the step ratio on the higher speed stage side having the smaller value can be increased. Thus, this configuration can eliminate or minimize the unequal period from the time point of the upshift to the time point of the next upshift. As a result, when the second shift change mode, in which the speed of the engine 2 is maintained in the high state, is set, the shift change is not performed at the different timing from the driver's intended timing, which can eliminate or minimize the chance of giving the driver the sense of discomfort. Therefore, the drivability improves in the vehicle 10 on which the transmission 1 with the multiple shift stages is mounted.

The above description has been made on the transmission 1 that is an instance of the transmission as the target of the shift change control by the control device 100. However, the configuration of the transmission as the target of the shift change control by the control device 100 is not limited to such an instance. The transmission as the target of the shift change control by the control device 100 only needs to have the multiple shift stages and change the amount of the power output from the engine 2 of the vehicle 10 for the output. For instance, the transmission as the target of the shift change control by the control device 100 may not have the nine forward shift stages and the one reverse shift stage. In addition, the number of the planetary gear mechanisms and the number of the coupling mechanisms that are provided in the transmission as the target of the shift change control by the control device 100 may differ from those in the transmission 1. Furthermore, the gear ratio at the each shift stage of the transmission as the target of the shift change control by the control device 100 may differ from that of the transmission 1.

The above description has been made on the instance in which the forward second speed stage (2nd) and the forward sixth speed stage (6th) are excluded when the second shift change mode is set in the shift change control according to the example. However, the shift stages that are excluded when the second shift change mode is set are not limited to the above instance. The shift stages that are excluded when the second shift change mode is set may differ in accordance with the gear ratio at the each shift stage of the transmission as the target of the shift change control by the control device 100.

The above description has been made on the instance in which the acceleration sensor 203 is used to compute the road surface gradient. However, a different sensor from the acceleration sensor 203 may be used to compute the road surface gradient. For instance, a three-axis gyroscope sensor may be used as such a sensor. In this case, the acceleration sensor 203 may be eliminated from the configuration of the vehicle 10.

The above description has primarily been made on the instance in which the wet multiple-disc brake and the wet multiple-disc clutch are used as the each brake and the each clutch in the transmission 1, respectively. However, a type of the each brake and a type of the each clutch are not limited to those in such an instance. The each brake and the each clutch only have to be able to switch the coupling state between the elements.

The processing that has been described by using the flowchart in the present specification does not always have to be executed in the order illustrated in the flowchart. Some of the processing steps may be executed in parallel. For instance, in the flowchart illustrated in FIG. 8, step S509 and step S513 may not be processed in the order indicated by the flowchart but may be processed in parallel. An additional processing step may be adopted. Alternatively, some of the processing steps may not be provided.

Although the preferred example of the present invention has been described in detail with reference to the accompanying drawings, the present invention is not limited to the example. Provided a person has ordinary knowledge in the technical field to which the example of the present invention pertains, within the scope of the technical idea described in the claims, the example of the present invention is intended to cover various modifications and applications, and such modifications and applications are intended to fall within the technical scope of the present invention.

The invention claimed is:

1. A control device for a transmission, the transmission having multiple shift stages and being configured to change an amount of power output from an engine of a vehicle for output, the control device comprising:
   a setting unit capable of setting, as a shift change mode, either one of a first shift change mode and a second shift change mode in which a speed of the engine is maintained in a higher state than that in the first shift change mode; and
   a control unit configured to execute shift change control on a basis of the set shift change mode, wherein
   when the second shift change mode is set, the control unit is configured to exclude one or more shift stages of the multiple shift stages in such a manner that, of step ratios between shift stages that are permitted to be used, a number of step ratios that have higher values than adjacent step ratios thereof on a low speed stage side becomes smaller than that in a case where none of the shift stages is excluded and execute the shift change control.

2. The control device for the transmission according to claim 1, wherein
   when the second shift change mode is set, the control unit is configured to exclude the one or more of the shift stages in such a manner that, of the step ratios between the shift stages that are permitted to be used in the case where none of the shift stages is excluded, the shift stage is excluded that is on the low speed stage side of and adjacent to the shift stage on the low speed stage side of the two shift stages corresponding to the step ratio that has the higher value than the adjacent step ratio on the low speed stage side.

3. The control device for the transmission according to claim 1, wherein
   the setting unit is configured to set the second shift change mode as the shift change mode when it is determined that a driver of the vehicle has selected the second shift change mode.

4. The control device for the transmission according to claim 2, wherein
   the setting unit is configured to set the second shift change mode as the shift change mode when it is determined that a driver of the vehicle has selected the second shift change mode.

5. The control device for the transmission according to claim 3, wherein
   the control unit is configured to permit an upshift from a shift stage to a first shift stage in the case where it is determined that the vehicle travels steadily when the second shift change mode is set in accordance with a selecting operation by the driver of the vehicle, the shift stage being one of the one or more shift stages and being an adjacent shift stage on the low speed stage side of the first shift stage.

6. The control device for the transmission according to claim 4, wherein
   the control unit is configured to permit an upshift from a shift stage to a first shift stage in the case where it is determined that the vehicle travels steadily when the second shift change mode is set in accordance with a selecting operation by the driver of the vehicle, the shift stage being one of the one or more shift stages and being an adjacent shift stage on the low speed stage side of the first shift stage.

7. The control device for the transmission according to claim 5, wherein
the control unit is configured to determine whether the vehicle travels steadily on a basis of a road surface gradient and a vehicle speed.

8. The control device for the transmission according to claim 6, wherein
the control unit is configured to determine whether the vehicle travels steadily on a basis of a road surface gradient and a vehicle speed.

9. The control device for the transmission according to claim 3, wherein
when the second shift change mode is set in accordance with the selecting operation by the driver of the vehicle, the control unit is configured to permit a downshift from a shift stage to a second shift stage in the case where it is determined that a kickdown operation has been performed by the driver of the vehicle, the shift stage being one of the one or more shift stages and being a shift stage on a high speed stage side of the second shift stage.

10. The control device for the transmission according to claim 4, wherein
when the second shift change mode is set in accordance with the selecting operation by the driver of the vehicle, the control unit is configured to permit a downshift from a shift stage to a second shift stage in the case where it is determined that a kickdown operation has been performed by the driver of the vehicle, the shift stage being one of the one or more shift stages and being a shift stage on a high speed stage side of the second shift stage.

11. The control device for the transmission according to claim 9, wherein
the control unit is configured to determine whether the kickdown operation has been performed on a basis of an accelerator opening degree of the vehicle.

12. The control device for the transmission according to claim 10, wherein
the control unit is configured to determine whether the kickdown operation has been performed on a basis of an accelerator opening degree of the vehicle.

13. The control device for the transmission according to claim 1, wherein
the setting unit is configured to set the second shift change mode as the shift change mode in the case where it is estimated that the driver of the vehicle has an intention of rapid acceleration.

14. The control device for the transmission according to claim 1, wherein
the setting unit is configured to set the second shift change mode as the shift change mode in the case where it is estimated that the driver of the vehicle has an intention of rapid acceleration.

15. The control device for the transmission according to claim 13, wherein
the setting unit is configured to estimate whether the driver of the vehicle has the intention of the rapid acceleration on the basis of the accelerator opening degree of the vehicle.

16. The control device for the transmission according to claim 14, wherein
the setting unit is configured to estimate whether the driver of the vehicle has the intention of the rapid acceleration on the basis of the accelerator opening degree of the vehicle.

* * * * *